(12) United States Patent
Kim

(10) Patent No.: US 12,319,302 B2
(45) Date of Patent: Jun. 3, 2025

(54) METHOD AND SYSTEM FOR ASSISTING CIRCUIT DRIVING

(71) Applicants: HYUNDAI MOTOR COMPANY, Seoul (KR); KIA CORPORATION, Seoul (KR)

(72) Inventor: Minhan Kim, Gyeonggi-do (KR)

(73) Assignees: Hyundai NAME Motor Company, Seoul (KR); Kia Corporation, Seoul (KR)

( * ) Notice: Subject to any disclaimer, the term of this patent is extended or adjusted under 35 U.S.C. 154(b) by 191 days.

(21) Appl. No.: 17/839,994

(22) Filed: Jun. 14, 2022

(65) Prior Publication Data

US 2023/0159043 A1    May 25, 2023

(30) Foreign Application Priority Data

Nov. 23, 2021   (KR) ......................... 10-2021-0162295

(51) Int. Cl.
| | |
|---|---|
| *B60W 50/06* | (2006.01) |
| *B60W 40/08* | (2012.01) |
| *G06F 16/23* | (2019.01) |
| *G06F 16/28* | (2019.01) |

(52) U.S. Cl.
CPC ............ *B60W 50/06* (2013.01); *B60W 40/08* (2013.01); *G06F 16/2379* (2019.01); *G06F 16/285* (2019.01)

(58) Field of Classification Search
CPC ...... B60W 50/06; B60W 40/08; B60W 30/18; B60W 2556/10; B60W 2556/45; B60W 40/10; B60W 40/02; B60W 2420/403; G06F 16/2379; G06F 16/285; G06F 8/65

See application file for complete search history.

(56) References Cited

U.S. PATENT DOCUMENTS

| | | | |
|---|---|---|---|
| 9,672,734 B1* | 6/2017 | Ratnasingam ... | G08G 1/096741 |
| 2017/0061825 A1* | 3/2017 | Payne .................. | G09B 19/167 |
| 2018/0218639 A1* | 8/2018 | Ryuzaki ................ | G10L 13/033 |
| 2019/0291739 A1* | 9/2019 | Komizo ................ | B60W 40/09 |
| 2019/0316932 A1 | 10/2019 | Andreucci | |
| 2019/0332111 A1* | 10/2019 | Michalakis ............ | G06N 3/045 |
| 2021/0331079 A1 | 10/2021 | Guo et al. | |
| 2023/0022123 A1* | 1/2023 | Zhou .................... | G08G 1/0112 |

FOREIGN PATENT DOCUMENTS

| | | |
|---|---|---|
| JP | 2019-084113 A | 6/2019 |
| JP | 2020-021185 A | 2/2020 |
| KR | 10-2016-0037816 A | 4/2016 |
| KR | 10-1868407 B1 | 6/2018 |
| KR | 10-2021-0100191 A | 8/2021 |

* cited by examiner

*Primary Examiner* — Behrang Badii
(74) *Attorney, Agent, or Firm* — Morgan, Lewis & Bockius LLP

(57) ABSTRACT

A method of managing driving data for assisting circuit driving includes constructing a database based on source data including driving data for a circuit; generating a driving instruction for the circuit based on the database; providing at least one vehicle with the driving instruction; updating the database based on first driving data acquired by a first vehicle driving the circuit; updating the driving instruction for the circuit based on the updated database; and providing the at least one vehicle with the updated driving instruction.

16 Claims, 16 Drawing Sheets

FIG. 11

| RECORD DRIVING DATA | CIRCUIT FILTERING | USER FILTERING | VEHICLE FILTERING | |
|---|---|---|---|---|
| SHARE DRIVING DATA | USER 1 | AVANTE | CIRCUIT A | 01:15:37 |
| INPUT VEHICLE INFORMATION | USER 2 | AVANTE | CIRCUIT A | 01:13:25 |
| | USER 3 | AVANTE | CIRCUIT A | 01:12:27 |
| SEARCH FOR DRIVING DATA | USER 4 | AVANTE | CIRCUIT A | 01:12:23 |

| INVITE GROUP MEMBER | SEARCH FOR CIRCUIT | ◎ | CIRCUIT A | | |
|---|---|---|---|---|---|
| SEARCH GROUP ROOM | USER 1 | | AVANTE | A | WAITING |
| | USER 2 | | VELOSTER | B | DRIVING |
| | USER 3 | | TUSCAN | C | DRIVING |
| | USER 4 ⋮ | | GENESIS | A | WAITING |

| SET GROUP | GROUP MEMBER | TRAIN LINE | DISPLAY MAP | DISPLAY SPEED |
|---|---|---|---|---|
| | USER 1 | ✓ | ✓ | ✓ |
| | USER 2 | ✓ | ✓ | ☐ |
| | USER 3 | ☐ | ✓ | ✓ |
| | USER 4 | ☐ | ✓ | ☐ |

240

METHOD AND SYSTEM FOR ASSISTING CIRCUIT DRIVING

CROSS-REFERENCE TO RELATED APPLICATION

This application is based on and claims priority under 35 U.S.C. § 119 to Korean Patent Application No. 10-2021-0162295, filed on Nov. 23, 2021 in the Korean Intellectual Property Office, the disclosure of which is incorporated herein by reference.

TECHNICAL FIELD

The present disclosure relates to a method and system for assisting circuit driving, and more specifically, to a method and system for managing driving data for assisting circuit driving.

BACKGROUND

People enjoy various hobbies to satisfy individual needs thereof. As an example of various hobbies, there is an automobile race in which drivers have a speed completion in vehicles.

However, when running an automobile race on a general road, traffic laws need to be complied with, and the risk of collision with a general vehicle is high with the competitive spirit of the driver.

A circuit is a place in which drivers run a race in vehicles, and also referred to as a racing track, and an operation of driving a vehicle on a circuit is referred to circuit driving. Drivers may show off their driving skills by competing with others through circuit driving.

However, circuit driving is considered a dangerous hobby with entry barriers for the general public.

SUMMARY

Therefore, it is an object of the disclosure to provide a method and system for easily sharing driving data acquired through circuit driving among users.

It is another object of the disclosure to provide a method and system for sharing driving instructions for circuit driving among users.

The technical objectives of the disclosure are not limited to the above, and other objectives may become apparent to those of ordinary skill in the art based on the following descriptions.

According to an aspect of the disclosure, there is provided a method of assisting circuit driving, which is a method of managing driving data for assisting circuit driving, the method including: constructing a database based on source data including driving data for a circuit; generating a driving instruction for the circuit based on the database; providing at least one vehicle with the driving instruction; updating the database based on first driving data acquired by a first vehicle driving the circuit; updating the driving instruction for the circuit based on the updated database; and providing the at least one vehicle, with the updated driving instruction.

The updating of the database may include: receiving a user input from a first user who drives the first vehicle to permit sharing of the first driving data; and updating the database based on the first driving data only when the user input is received.

The receiving of the user input to permit sharing of the first driving data may include: receiving a first user input to permit sharing of a part of the first driving data; and receiving a second user input to permit sharing of all of the first driving data.

The first driving data may include at least one of profile information of a first user who drives the first vehicle, information about the first vehicle, information about sensor values acquired from a plurality of sensors provided in the first vehicle, image information acquired from a camera provided in the first vehicle, or driving record information of the first vehicle.

The information about the first vehicle may include tuning information of the first vehicle.

The method may further: receiving, from a second user who drives a second vehicle, a user input for requesting download of the first driving data; and providing the second vehicle with the first driving data based on the user input being received from the second user.

The updating of the driving instruction for the circuit based on the updated database may include: generating a first driving instruction based on the first driving data; and adding the first driving instruction as the driving instruction for the circuit.

The method may further include: receiving, from a second user who drives a second vehicle, a user input for requesting download of the first driving instruction; and providing the second vehicle with the first driving instruction based on the user input being received from the second user.

The method may further include: based on a user input to classify a second user who drives a second vehicle and a third user who drives a third vehicle into one group being received, classifying the second user and the third user into the one group; and based on the second user and the third user belonging to the one group, providing the third vehicle with second driving data acquired by the second vehicle driving the circuit in real time, and providing the second vehicle with third driving data acquired by the third vehicle driving the circuit in real time.

The method may further include: determining a ranking of the at least one vehicle for the circuit based on the updated database, and providing the at least one vehicle with information about the ranking of the at least one vehicle.

According to another aspect of the disclosure, there is provided a system for assisting circuit driving, which is a system for managing driving data for assisting circuit driving, the system including: a server configured to store a database that is constructed based on source data including driving data for a circuit, generate a driving instruction for the circuit based on the database, and transmit the driving instruction to at least one vehicle; and the at least one vehicle configured to receive the driving instruction from the server, wherein a first vehicle among the at least one vehicle is configured to transmit, to the server, first driving data acquired by driving the circuit, and the server is configured to update the database based on the first driving data, update the driving instruction for the circuit based on the updated database, and transmit the updated driving instruction to the at least one vehicle.

The first vehicle may be configured to, only when a user input is received via the first vehicle to permit sharing of the first driving data, transmit the first driving data to the server.

The first vehicle may be configured to, based on a first user input to permit sharing of a part of the first driving data being received via the first vehicle, transmit the part of the first driving data to the server, and based on a second user input to permit sharing of all of the first driving data being received via the first vehicle, transmit all of the first driving data to the server.

The first driving data may include at least one of profile information of a first user who drives the first vehicle, information about the first vehicle, information about sensor values acquired from a plurality of sensors provided in the first vehicle, image information acquired from a camera provided in the first vehicle, or driving record information of the first vehicle.

The information about the first vehicle may include tuning information of the first vehicle.

A second vehicle among the at least one vehicle may be configured to, based on a user input to request download of the first driving data being received, transmit a request signal for requesting transmission of the first driving data to the server, and the server may be configured to, based on the request signal being received from the second vehicle, transmit the first driving data to the second vehicle.

The server may be configured to: generate a first driving instruction based on the first driving data; and add the first driving instruction as the driving instruction for the circuit.

A second vehicle among the at least one vehicle may be configured to, based on a user input to request download of the first driving instruction being received, transmit a request signal for requesting transmission of the first driving instruction to the server, and the server may be configured to, based on the request signal being received from the second vehicle, transmit the first driving instruction to the second vehicle.

The at least one vehicle may include a second vehicle and a third vehicle, and at least one of the second vehicle or the third vehicle may be configured to, based on a user input to classify the second vehicle and the third vehicle into one group being received, transmit a classification request signal to the server, and the server may be configured to, based on the classification request signal being received, classify the second vehicle and the third vehicle into the one group, and based on the second vehicle and the third vehicle belonging to the one group, transmit second driving data acquired by the second vehicle driving the circuit to the third vehicle in real time, and transmit third driving data acquired by the third vehicle driving the circuit to the second vehicle in real time.

The server may be configured to determine a ranking of the at least one vehicle for the circuit based on the updated database, and provide the at least one vehicle with information about the ranking of the at least one vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 11 is a drawing illustrating an example of a user interface for obtaining driving data by a user;

FIG. 13 shows an example of a user interface for allowing a user to join a group;

FIG. 14 is a diagram illustrating an example of a user interface for allowing a user to select driving data to be transmitted from a group member;

DETAILED DESCRIPTION

Figure 1:
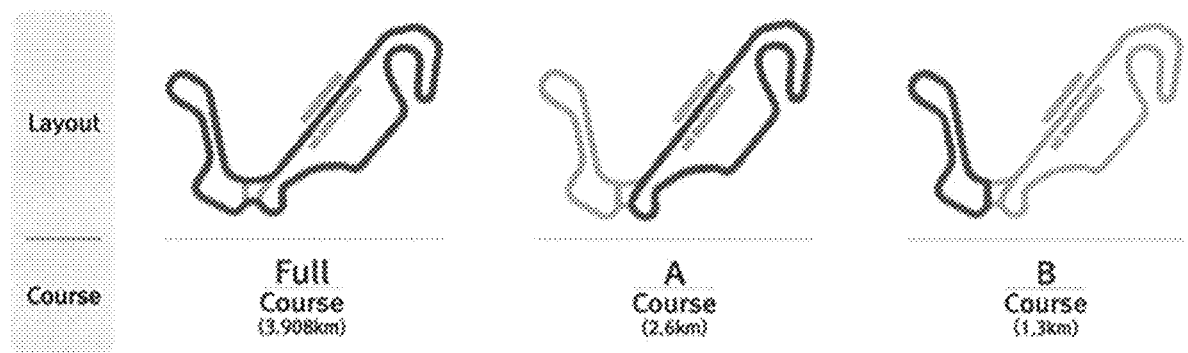
FIG. 1 is a diagram for describing an example of a circuit.

Advantages and features of embodiments, and methods of achieving the same will be clearly understood with reference to the accompanying drawings and the following detailed embodiments. However, the present inventive concept is not limited to embodiments described herein, but may be implemented in various different forms. Embodiments are provided in order to explain the present inventive concept for those skilled in the art. The scope of the present inventive concept is defined by the appended claims.

The terms used herein will be briefly described and embodiments will be described in detail.

Although the terms used herein are selected from among general terms that are currently and widely used in consideration of functions in embodiments, these may be changed according to intentions or customs of those skilled in the art or the advent of new technology. In addition, in a specific case, some terms may be arbitrary selected by applicants. In this case, meanings thereof will be described in a corresponding description of embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that may be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules 7 such that the respective component and modules may be merged in respect to the functionality.

Hereinafter, with reference to the accompanying drawings, embodiments of a face authentication system, a vehicle including the same, and a face authentication method will be described in detail so that a person skilled in the art can easily implement the disclosed invention. In addition, parts irrelevant to description are omitted in the drawings in order to clearly explain exemplary embodiments. In the accompanying drawings, parts that are identical or equivalent to each other will be assisted the same reference numerals, and in the following description of the embodiments, details of redundant descriptions thereof will be omitted.

Hereinafter, embodiments of a system 1 and method for assisting circuit driving will be described in detail with reference to the accompanying drawings. In addition, parts irrelevant to description are omitted in the drawings in order to clearly explain embodiments.

FIG. 1 is a diagram for describing an example of a circuit.

Referring to FIG. 1, a circuit may refer to a track on which a driver runs an automobile race, and even when a drive drives the same circuit, the circuit may have different driving routes according to a plurality of courses.

The circuit in the present disclosure may include not only a track having a starting point that is the same as an ending point but also a track having a starting point that is different from an ending point.

In addition, the circuit map information in the present disclosure may include not only information about the circuit but also information about each of a plurality of courses in which the circuit is driven.

Figure 2:
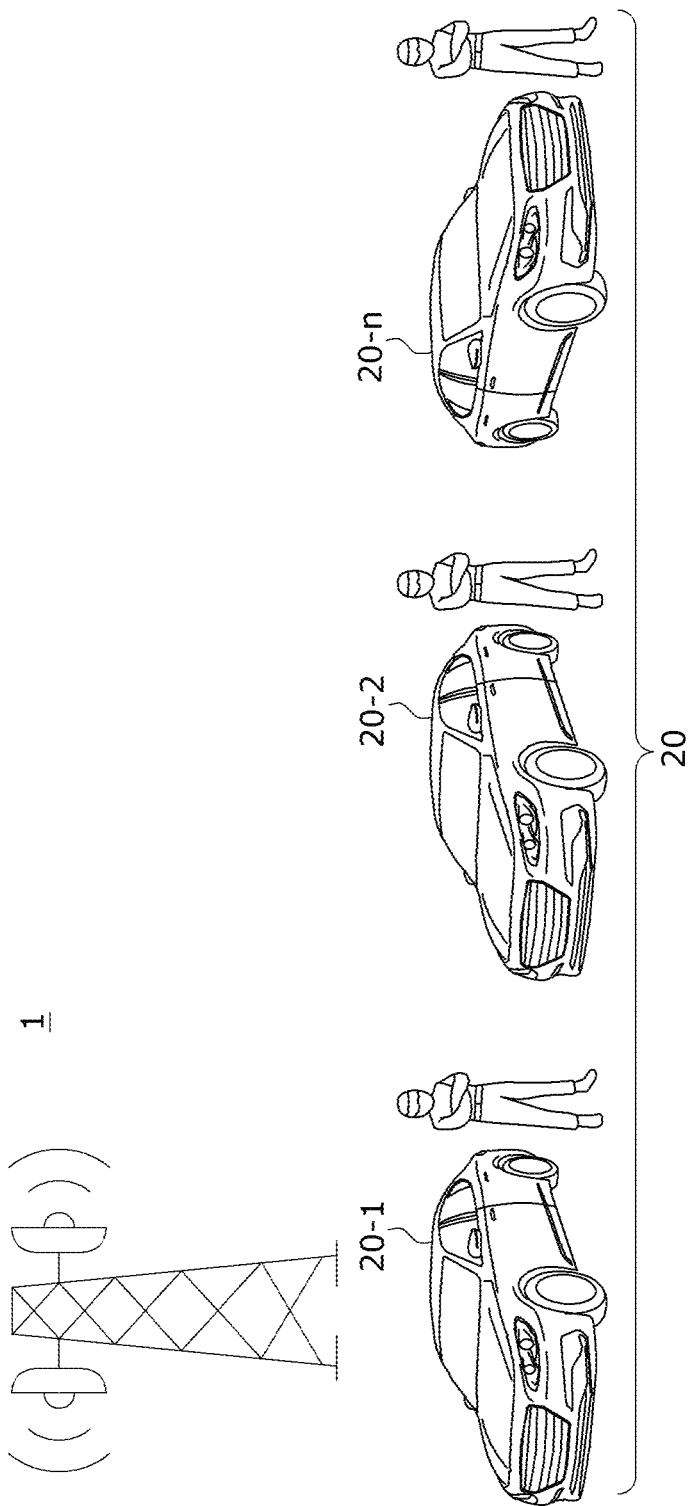
FIG. 2 illustrates a system for assisting circuit driving according to an embodiment.
Figure 3:
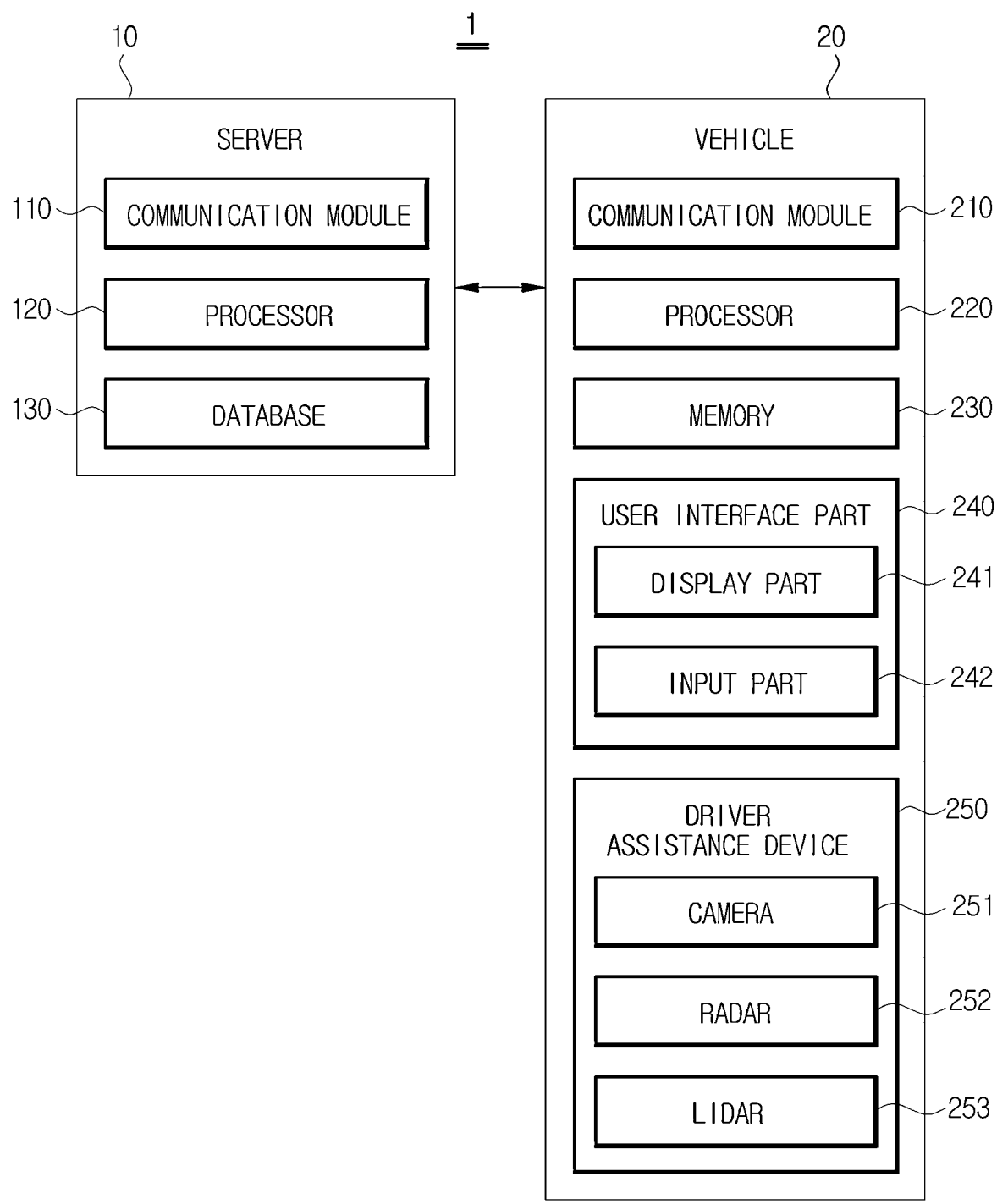
FIG. 3 is a block diagram for describing a configuration of a system for assisting circuit driving according to an embodiment.

FIG. 2 illustrates a system for assisting circuit driving according to an embodiment. FIG. 3 is a block diagram for describing a configuration of a system for assisting circuit driving according to an embodiment.

Referring to FIGS. 2 and 3, a system 1 for assisting circuit driving according to the embodiment may include a server 10 and a plurality of vehicles 20 communicating with the server 10.

The server 10 may store a database 130 constructed based on source data including driving data for the circuit, generate a driving instruction for the circuit based on the database 130, and provide the plurality of vehicles 20 with the driving instruction.

The source data may include driving data acquired from a manufacturer and/or an operator of the system 1 for assisting circuit driving.

The driving data may include information about sensor values acquired through a plurality of sensors and/or information acquired by a driver assistance device while an arbitrary vehicle is driving on an arbitrary circuit, and may include information about the arbitrary vehicle and/or information about the arbitrary circuit. In addition, the driving data may further include weather information (e.g., temperature information, humidity information).

The server 10 may further include at least one memory for storing the database 130 constructed based on the source data, and may utilize the database 130 based on a big data analysis algorithm.

For example, the server 10 may classify driving data constructing the database 130 according to the type of a circuit and/or the type of a vehicle, and calculate a driving instruction for a specific circuit based on the driving data.

To this end, the server 10 may include at least one processor 120 for processing data stored in the database 130.

The processor 120 may calculate a plurality of driving instructions based on the processing of the driving data that constructs the database 130.

According to the embodiment, the processor 120 may include a hardware structure specialized for processing an artificial intelligence model. Artificial intelligence models may be generated through machine learning. Such learning may be performed, for example, by the vehicle 20, or may be performed through the server 10. Learning algorithms may include, for example, supervised learning, unsupervised learning, semi-supervised learning, or reinforcement learning, but the disclosure is not limited to the above example. An artificial intelligence model may include a plurality of artificial neural network layers. An artificial neural network may include a deep neural network (DNN), a convolutional neural network (CNN), a recurrent neural network (RNN), a restricted boltzmann machine (RBMs), a deep belief network (DBN), a bidirectional recurrent deep neural network (BRDNN), a deep Q-networks, or a combination of two or more of the above, but the disclosure is not limited to the above example. The artificial intelligence model may include, additionally, or alternatively, a software structure in addition to the hardware structure.

The processor 120 may use the driving data as training data to execute a learning algorithm for outputting an optimal driving instruction, and may use the trained artificial intelligence model to output an optimal driving instruction from driving data.

That is, the processor 120 may use driving data as input data to output a driving instruction as output data.

An example, the processor 120 may use driving data acquired from the plurality of vehicles 20 as input data to output an optimal driving instruction.

As another example, the processor 120 may use driving data acquired from a single vehicle 20 as input data to output a driving instruction corresponding to a driving route of the single vehicle 20.

In addition, the processor 120 may execute an algorithm for executing the above-described operations and/or operations to be described below. For example, the processor 120 may control the communication module 110 to transmit driving data and/or driving instructions to the vehicle 20.

The database 130 may include a plurality of driving instructions output from the processor 120.

Details of the driving data and driving instruction will be described below.

The server 10 may transmit driving data constructing the database 130 and a plurality of driving instructions to the plurality of vehicles 20.

To this end, the server 10 may include the communication module 110 for communicating with the plurality of vehicles 20.

The communication module 110 is a wireless communication module (e.g., a cellular communication module, a short-range wireless communication module, or a global navigation satellite system (GNSS) communication module) or a wired communication module (e.g., a local area network (LAN) communication module, or a power line communication module). The communication module 110 may communicate with the vehicle 20 of outside through a first network (e.g., a short-range communication network, such as Bluetooth, wireless fidelity (WiFi) direct or infrared data association (IrDA) or a second network (e.g., a long range communication network, such as a legacy cellular network, a 5G network (e.g., OTA)), a next-generation communication network, the Internet, and a computer network (e.g., LAN or WAN).

The vehicle 20 may receive driving data and/or driving instructions from the server 10.

In addition, the vehicle 20 may transmit, to the server 10, driving data acquired while driving the circuit.

According to various embodiments, the plurality of vehicles 20 may share driving data with each other through V2V communication.

To this end, the vehicle 20 may include a communication module 210 for communicating with another vehicle and/or the server 10, and the communication module 210 of the vehicle 20 may transmit and receive data to and from the communication module 110 of the server 10. The communication module 210 of the vehicle 20 may represent the same configuration as the communication module 110 of the server 10, and the same descriptions will be omitted.

The vehicle 20 includes a memory 230 that memorizes/stores programs, instructions, and data for controlling various components (e.g., a user interface part 240) of the vehicle 20, and a processor 220 that generates a control signal for controlling the operation of the vehicle 20 based on the programs, the instructions, and the data memorized/stored in the memory 230.

For example, the memory 230 may store a program for processing the driving instruction received from the server 10 into a form that may be displayed on a display part 241, and the processor 220 may process the driving instruction received from the server 10 into a form that may be displayed on the display part 241 based on the stored program, and control the display part 241 to display the driving instruction.

In addition, the processor 220 may include an image signal processor and/or a digital signal processor that process data (e.g., image data, radar data, and Lidar data) acquired from the driver assistance device 250. The processor 220 and the memory 230 may be implemented as separate chips or as a single chip.

In addition, the processor 220 may process data (e.g., speed data, steering angle data, and pedal input data) acquired from various sensors of the vehicle 20.

The processor 220 may include a logic circuit and an arithmetic circuit, process data according to programs/instructions provided from the memory 230, and generate a control signal according to a result of processing. The memory 230 may temporarily memorize data received from various sensors of the vehicle 20 and/or the driver assistance device 250, and temporarily memorize a result of data processed by the processor 220. The memory 230 may include not only volatile memories, such as S-RAM and D-RAM, but also nonvolatile memories, such as a flash memory, a read-only memory (ROM), an erasable programmable read only memory (EPROM), etc.

The processor 220 may communicate with various electronic components of the vehicle 20 through a vehicle communication network. For example, the processor 220 may exchange data with electronic components through Ethernet, Media Oriented Systems Transport (MOST), Flexray, Controller Area Network (CAN), Local Interconnect Network (LIN), etc.

For example, the processor 220 may acquire image information, radar information, and/or Lidar information acquired from the driver assistance device 250 through a vehicle communication network, and acquire information about sensor values acquired from various vehicle sensors.

Although not shown in the drawings, the vehicle 20 may include a plurality of vehicle sensors for acquiring driving data of the vehicle 20. The plurality of vehicle sensors will be described below.

The vehicle 20 may include a user interface part 240 for communicating with a user (driver).

The user interface part 240 includes a display part 241 for displaying various types of information related to circuit driving (e.g., driving data and/or driving instructions) and an input part 242 for receiving various user inputs related to circuit driving.

The display part 241 may include at least one display. The at least one display may be a Light Emitting Diode (LED) panel, an Organic Light Emitting Diode (OLED) panel, a Liquid Crystal Display (LCD) panel, and/or an indicator. In addition, the display part 241 may include a touch screen.

For example, the display part 241 may include a navigation device (an AVN device), a heads-up display, and/or a cluster.

The display part 241 may output driving data and/or driving instructions processed by the processor 220.

The input part 242 may include buttons, dials, and/or touchpads provided at various locations within the vehicle 20.

For example, the input part 242 may include a push button, a touch button, a touch pad, a touch screen, a dial, a stick-type operation device, and/or a track ball. When the input part 242 is implemented as a touch screen, the input part 242 may be provided integrally with the display part 241.

The input part 242 may receive a user input for receiving driving data and/or driving instruction from the server 10 and/or a user input for displaying driving data and/or driving instruction.

For example, the processor 220 may, in response to a user input for receiving a driving instruction being received through the input part 242, control the communication module 210 to transmit a request signal for requesting the driving instruction from the server 10.

The vehicle 20 may include the driver assistance device 250 for assisting the driver.

The driver assistance device 250 includes at least one camera 251 for acquiring an image of a surrounding of the vehicle 20, at least one radar 252 for detecting an object of a surrounding of the vehicle 20, and/or a Lidar 253 for acquiring point cloud data of a surrounding of the vehicle 20.

Although not shown in the drawings, the driver assistance device 250 may further include a global positioning system (GPS) module for acquiring location information of the vehicle 20. The GPS module may acquire GPS information of the vehicle 20. The GPS information may include location data of the vehicle 20.

The camera 251 may include a front camera having a field of view facing in a forward direction of the vehicle 20, a rear camera having a field of view facing in a rear direction of the vehicle 20, and a side camera having a field of view facing in a side direction of the vehicle 20.

According to various embodiments, the camera 251 may include a black box camera for recording a driving situation of the vehicle 20.

The camera 251 may be electrically connected to the processor 220. For example, the camera 251 may be connected to the processor 220 through a vehicle communication network, a hard wire, or a printed circuit board (PCB).

The processor 220 may, based on the image acquired from the camera 251 being processed, recognize an object around the vehicle 20.

In an embodiment, the processor 220 may, based on images acquired from the plurality of cameras 251 being processed, acquire a bird's eye view of the vehicle 20.

Specifically, the processor 220 may, based on image data being processed, acquire environmental information of a circuit road around the vehicle 20.

The radar 252 may include a front radar having a field of sensing that faces in a forward direction of the vehicle 20, a rear radar having a field of sensing that faces in a rear direction of the vehicle 20, and a side radar having a field of sensing that faces in a side direction of the vehicle 20.

The radar 252 may be electrically connected to the processor 220. For example, the radar 252 may be connected to the processor 220 through a vehicle communication network, a hard wire, or a PCB.

The processor 220 may, based on detection data acquired from the radar 252 being processed, recognize an object around the vehicle 20.

The Lidar 253 may acquire a relative position, relative speed, etc. of a moving object (e.g., another vehicle, a pedestrian, a cyclist, etc.) around the vehicle 20. In addition, the Lidar 253 may acquire the shape and position of a nearby fixed object (e.g., a track line, a sign, a traffic light, a bump, etc.). The Lidar 253 may be installed in the vehicle 20 to have an external view of the vehicle 20, and may acquire point cloud data for the external view of the vehicle 20.

The processor 220 may process the point cloud data acquired from the Lidar 253 to recognize the structure of the circuit around the vehicle 20.

Hereinafter, an example of implementing a method of assisting circuit driving using each configuration of the system 1 for assisting circuit driving described above will be described.

Figure 4:
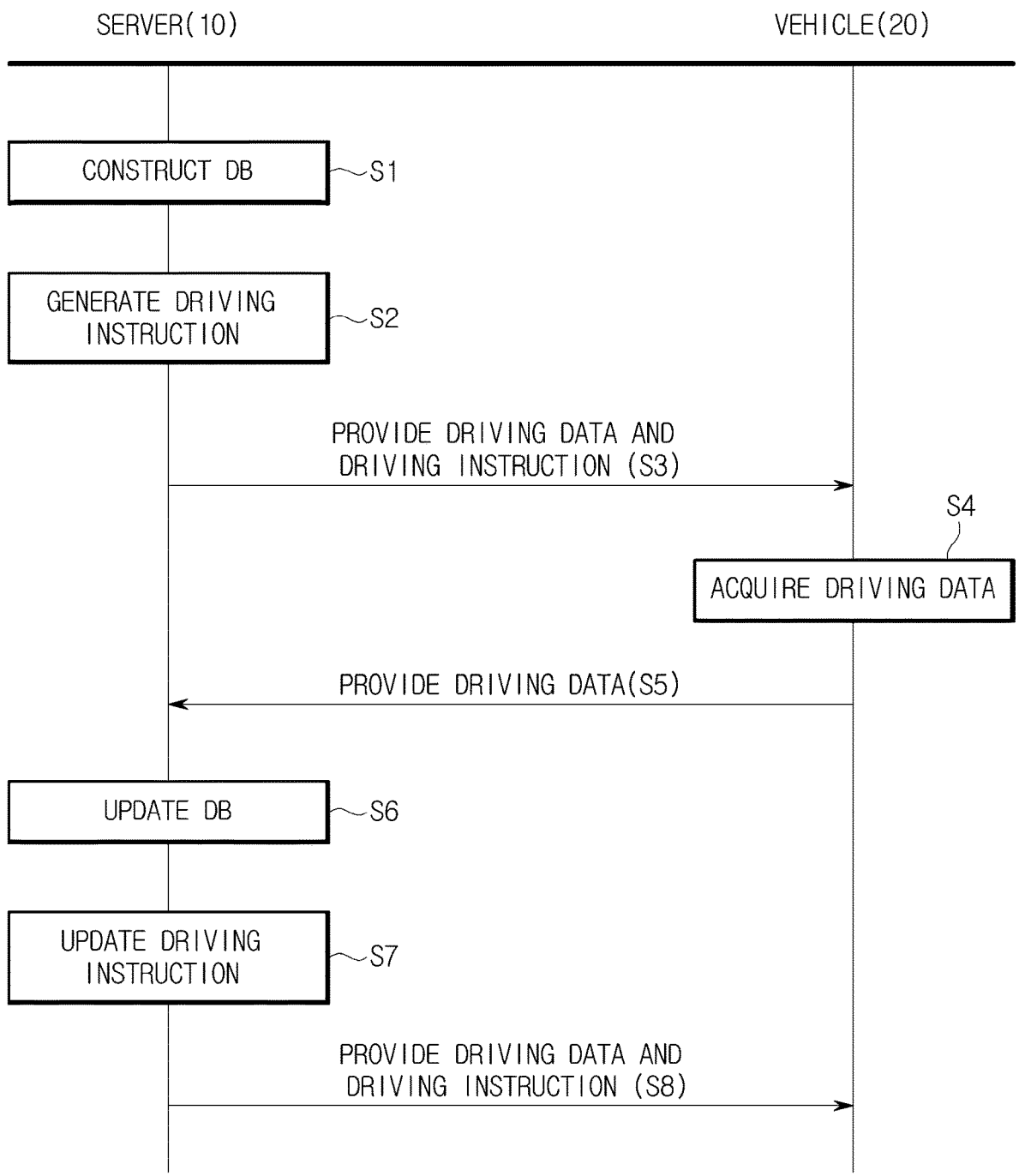
FIG. 4 is a flowchart showing an example of a method of assisting circuit driving according to an embodiment.

FIG. 4 is a flowchart showing an example of a method of assisting circuit driving according to an embodiment.

Referring to FIG. 4, the server 10 may construct a database 130 based on source data (S1).

In the constructing of the database 130 (S1), various types of source data may be acquired through a manufacturer and/or an operator of the system 1 for assisting circuit driving.

For example, the manufacturer and/or operator may generate a circuit map of the system 1 for assisting circuit driving and collect circuit driving data for each vehicle type corresponding to the circuit map to construct the database 130.

The server 10 may generate a plurality of driving instructions based on the constructed database 130 (S2).

In the generating of the driving instruction (S2), the manufacturer and/or the operator may directly generate the driving instruction based on the database 130, or the driving instruction may be generated through the artificial intelligence learning model stored in the server 10.

As described above, a plurality of driving instructions may be generated in a manufacturing operation (e.g., a manufacturing operation of a vehicle) of the system 1 for assisting circuit driving.

The plurality of driving instructions may be stored in advance in the system 1 for assisting circuit driving mounted in the vehicle 20 in the manufacturing operation of the vehicle 20.

As another example, the server 10 may, based on a circuit driving assistance application being downloaded by a user through the user interface part 240 of the vehicle 20, provide the vehicle 20 with driving data and a plurality of driving instructions.

That is, the driving data and/or driving instruction stored in the server 10 may be provided to the vehicle 20 (S3).

A user may drive a circuit using the vehicle 20, and the vehicle 20 may acquire driving data while driving the circuit (S4).

The vehicle 20 may, based on a preset condition being satisfied, transmit the driving data acquired while driving the circuit to the server 10 (S5).

As an example, based on a user executing an application for providing the system 1 for assisting circuit driving through the user interface part 240 and then driving a circuit, driving data acquired from the vehicle 20 may be transmitted to the server 10.

The server 10 may, based on the driving data received from the vehicle 20, update the database 130 (S6). That is, the server 10 may utilize the driving data received from the vehicle 20 as a part of big data.

The server 10 may update the driving instructions based on the updated database 130 (S7). For example, an optimal driving instruction may be changed according to the updated database 130.

The server 10 may provide the updated driving instructions to the plurality of vehicles 20 (S8).

According to the present disclosure, the server 10 may continuously acquire driving data for the circuit from the plurality of vehicles 20 and accordingly update the database 130 and update the driving instructions, and thus the user may be provided with the most optimal driving guide.

Figure 5:
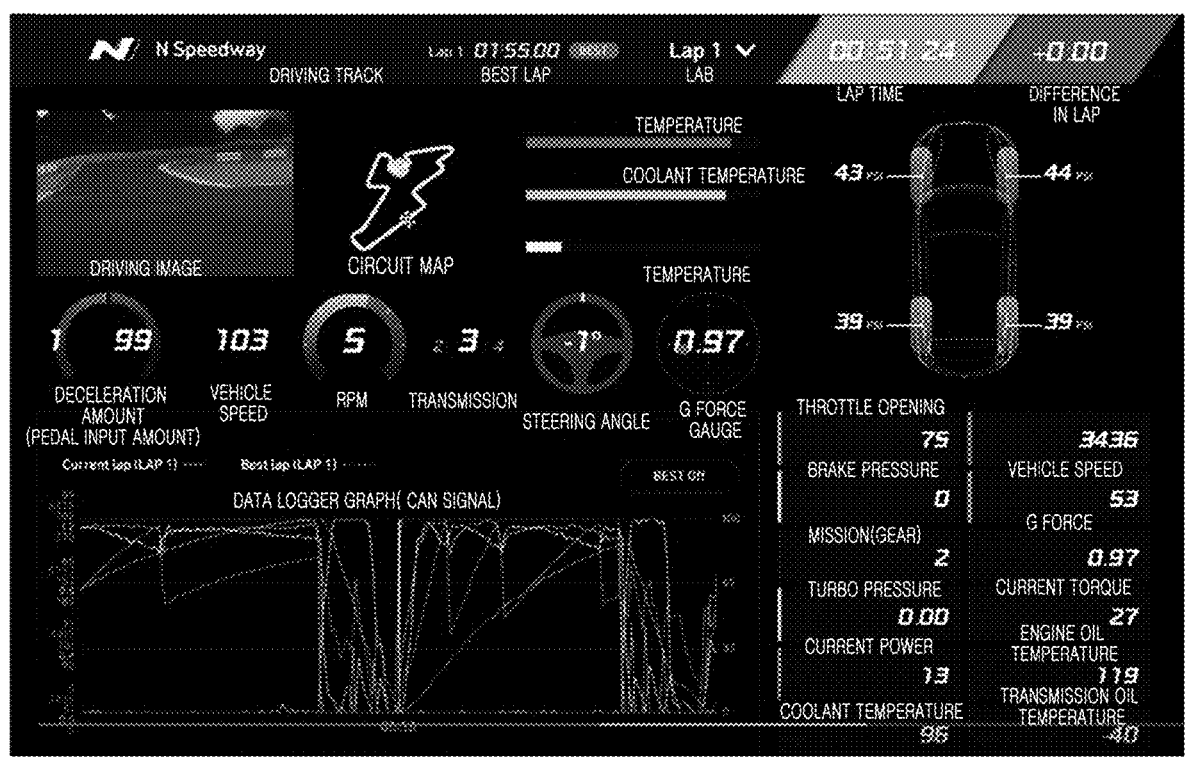
FIG. 5 illustrates an example of driving data according to an embodiment.
Figure 6:
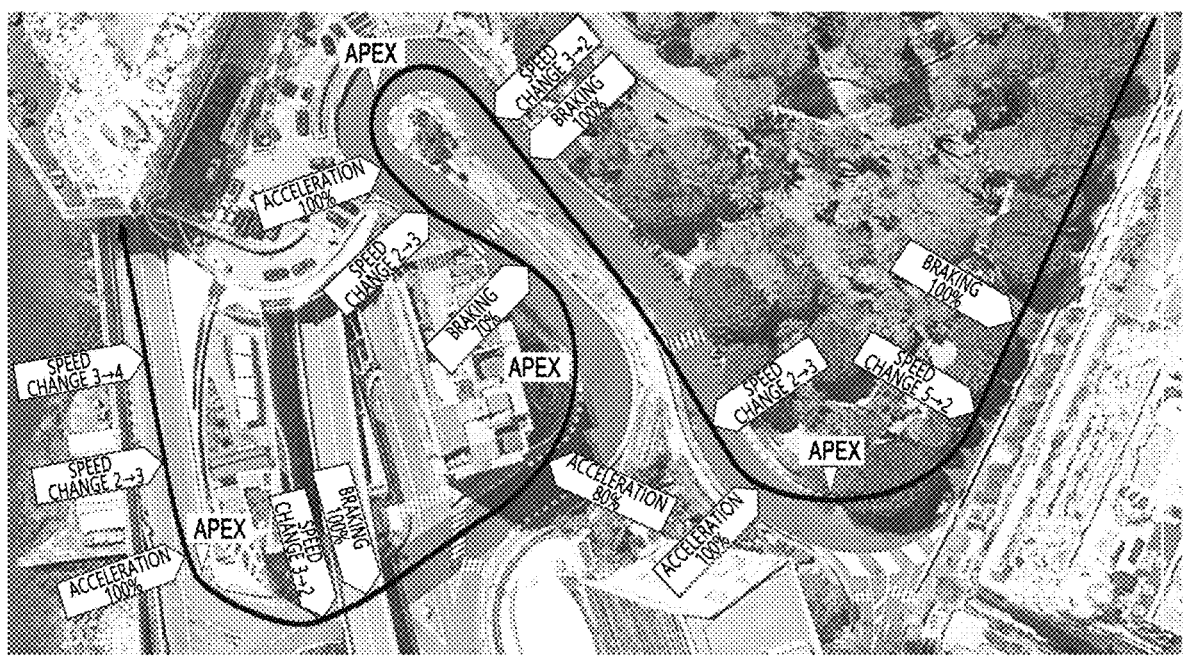
FIGS. 6 and 7 illustrate examples of driving instructions according to an embodiment.
Figure 7:
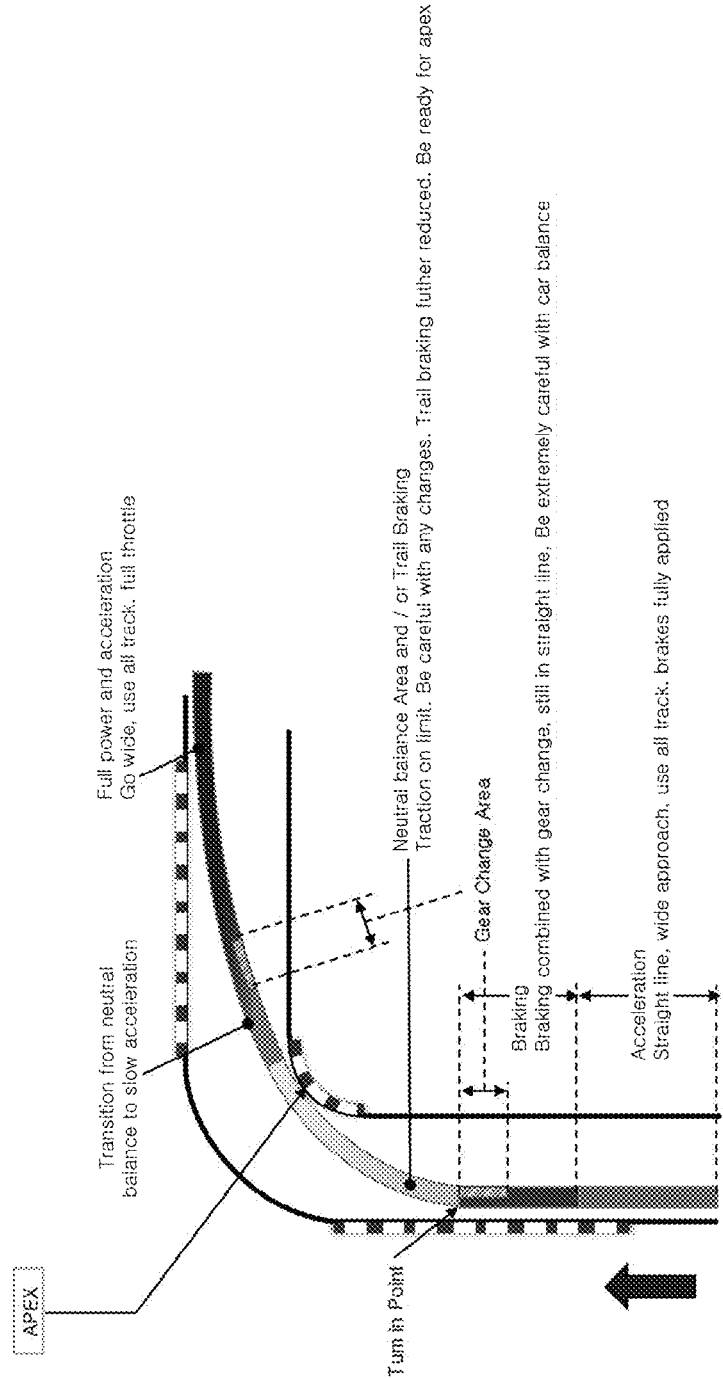

FIG. 5 illustrates an example of driving data according to an embodiment. FIGS. 6 and 7 illustrate examples of driving instructions according to an embodiment.

Referring to FIG. 5, driving data may include various types of data acquired while the vehicle 20 is driving a circuit.

For example, driving data includes information about a circuit, driving image information, location information of the vehicle 20 in the circuit, driving record information of the vehicle 20, engine oil temperature information, coolant temperature information, transmission oil temperature information, pedal input information, vehicle speed information, revolution per minute (RPM) information, transmission gear information, steering angle information, gravitational acceleration information, tire pressure information, throttle opening amount information, brake pressure information, turbo pressure information, and/or output information.

Such information may be transmitted to the processor 220 through a vehicle communication network (e.g., CAN communication), the processor 220 may process each piece of information, and the memory 230 may be store data processed by the processor 220.

As an example, the driving data may include information about a plurality of sensor values that change according to the location of the vehicle 20 in the circuit.

Furthermore, the driving data of the vehicle 20 may further include profile information of the user and information about the vehicle 20.

As an example, the user may execute an application for assisting circuit driving through the user interface part 240, make an access with an account of the user to input vehicle information and/or user information linked to the account, and the server 10 may store various pieces of information in linkage with the user's account.

The server 10 may, in response to first driving data being received from a first vehicle 20-1, store the first driving data including information about the first vehicle 20-1 and/or first user information.

The driving data may be data for generating a driving instruction for a circuit, and may include all types of data for generating a driving instruction.

The driving data may include vehicle specification information, circuit information, external environment information, vehicle operation information, vehicle inflow information, and additional information.

The vehicle specification information may include characteristic information of the vehicle 20, such as the body type, length/width/height/wheelbase/front/rear tread, weight, driving method, output, maximum torque, tire air pressure of the vehicle 20, etc.

The circuit information may include characteristic information of a circuit, such as a circuit course, cornering curvature, APEX, and inclination.

The external environment information may include external environment information, such as weather information and wind speed information when the driving data is generated.

The vehicle operation information may include information about acceleration/deceleration timing, acceleration/deceleration point, pedal input amount (tip in/out), shift and timing, vehicle speed, and steering amount of the vehicle 20 in the circuit.

The vehicle inflow information may include electronic control suspension (ECS) status, traction control, roll/yaw/pitch sensing data, slip/over/understeer, G-force gauge data, booster pressure, RPM, torque/output operation, various liquid/gas inflow/outflow amount/temperature, fuel consumption amount, and driving image information.

The additional information may include tuning information of the vehicle 20. The tuning information may refer to information about a tuning product attached to the vehicle 20, and the user may directly input tuning information through the user interface part 240.

Referring to FIGS. 6 and 7, the server 10 may generate driving instructions for each circuit based on the database 130. Hereinafter, for the sake of convenience of description, it is assumed that the server 10 generates a driving instruction for a specific circuit.

The driving instruction may be provided in a wide range of driving instructions depending on the use and purpose, and may be displayed together with content provided by an infotainment system (e.g., the user interface part 240) of the vehicle 20.

The driving instruction is related to control of the vehicle 20, and may be provided to the user in a manner matched with GPS-based location information of the vehicle 20.

For example, the driving instruction may include at least one of the recommended speed for each section of the circuit, the recommended braking point of the circuit, the recommended acceleration point of the circuit, the recommended speed change section of the circuit, the recommended steering amount for each section of the circuit, the APEX of the circuit, or the recommendation trail line of the circuit.

As will be described below, users belonging to one group may be provided with additional driving instructions.

For example, the driving instruction provided to users belonging to one group may include information about a lap time difference between competing vehicles and/or location information of the competing vehicles and/or speed information of the competing vehicles.

The information about the recommended speed for each section of the circuit may include information about a recommended speed that may be optimally driven in a corresponding section considering the driving characteristics and the limit speed of the vehicle 20.

The information about the recommended braking point of the circuit may include information about a section requiring braking before entering a corner and the degree of braking force.

The information about the recommended acceleration point of the circuit may include information about a recommended acceleration amount and a recommended tip-in amount considering optimization in entering the next corner after leaving a corner.

The information about the recommended speed change section of the circuit may include information about a recommended speed change section for efficient output operation before and after entering a corner.

The information about the recommended steering amount for each section of the circuit may include information about a recommended steering amount considering corner curvatures and terrain characteristics.

The information about the APEX of the circuit may include apex information considering driving characteristics and limits of the vehicle 20, the corner shape and the characteristics of the circuit, or the vehicle speed of the vehicle 20.

The information about the recommended trail line of the circuit may include information about a record line for the vehicle 20 to drive the circuit on an optimal path.

Circuit driving is characterized by driving while drawing a trail line (a record line) for optimal driving and utilizing the entire road width of the circuit road. In particular, as shown in FIG. 6, there is no lane in most circuits. In the circuit driving, the record is greatly affected by the trail line being drawn during the drive. Accordingly, based on the clear position of the vehicle on the road width of the circuit road and the current driving position, the relationship between a line drawn so far and a line to be drawn in the future is important. In addition, since most trail lines are based on action plans for the APEX and the corner, it is also very important to display action plans of the APEX and the corner.

The server 10 may map the driving of the vehicle 20 onto the circuit map based on the driving data constructing the database 130, and generate the driving instruction through simulation of the driving of the vehicle 20.

According to various embodiments, the driving instruction may be processed by the server 10 into a form (e.g., graphic/speech) that may be mapped to and usable in the infotainment system (e.g., the user interface part 240) of the vehicle 20, and transmitted to the vehicle 20.

According to another embodiment, the driving instruction may be transmitted to the vehicle 20, in which the driving instruction may be processed by the vehicle 20 into a form (e.g., graphic/speech) that may be mapped to and usable in the infotainment system (e.g., the user interface part 240) of the vehicle 20, and transmitted to the user.

For example, referring to FIG. 7, the vehicle 20 may display the trail line in different colors or display an action tip for each section such that the user recognizes the characteristics of each section, and may output a speech corresponding to each section based on the location of the vehicle 20 such that the user recognizes the action tip in each section.

Figure 8:
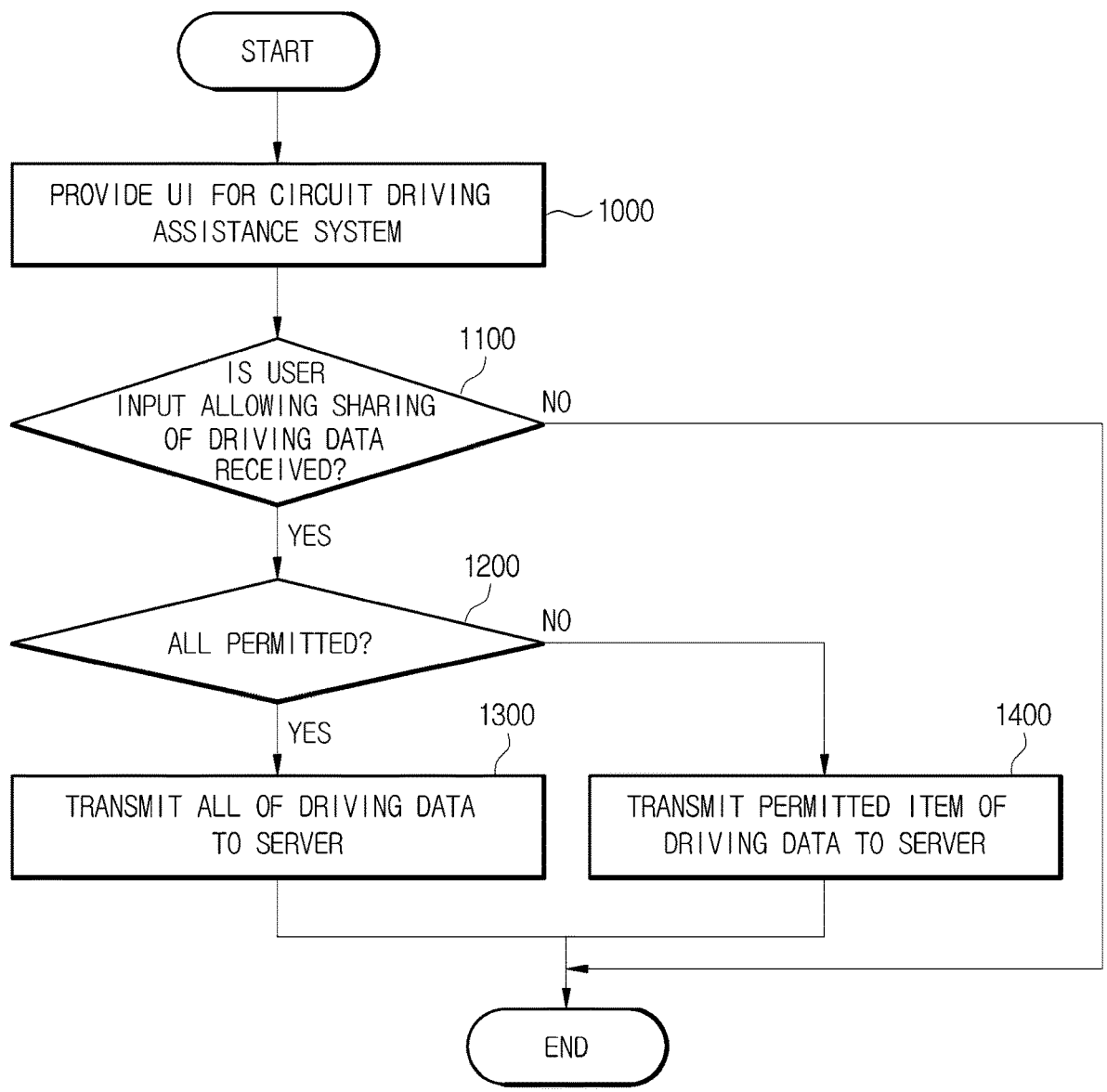
FIG. 8 is a flowchart showing an example of a method of sharing driving data based on a permission of a user.
Figure 9:
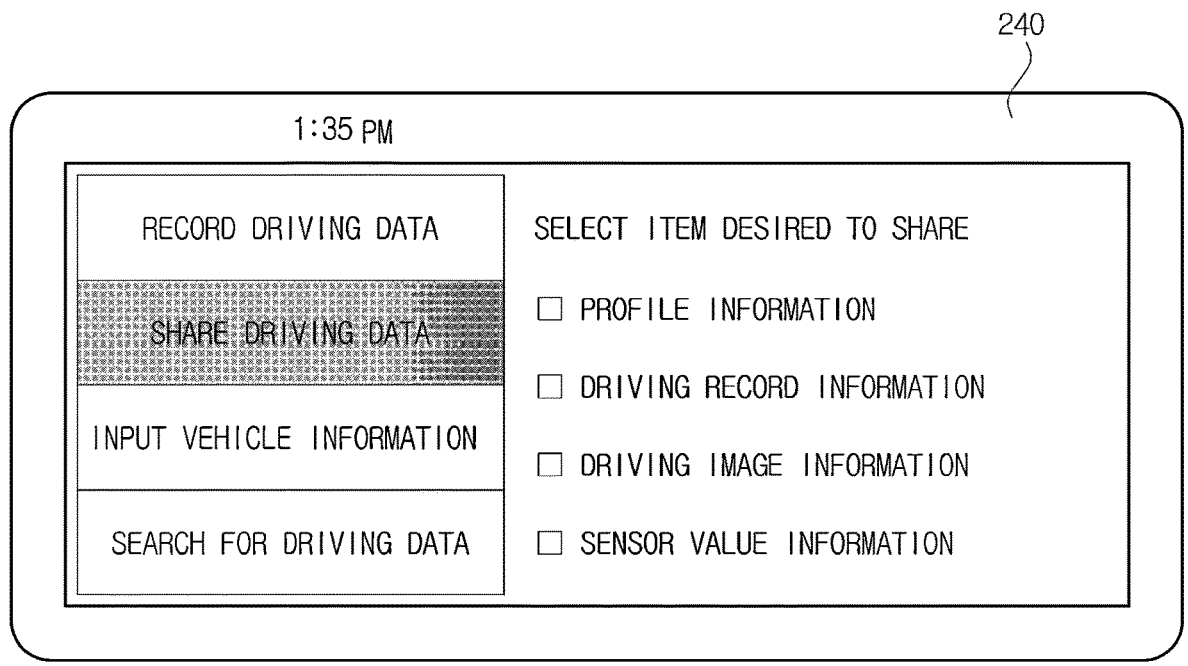
FIG. 9 is a diagram illustrates an example of a user interface for checking a driving data permission intention of a user.

FIG. 8 is a flowchart showing an example of a method of sharing driving data based on a permission of a user. FIG. 9 is a diagram illustrates an example of a user interface for checking a driving data permission intention of a user.

Hereinafter, for the sake of convenience of description, one of the plurality of vehicles 20 is assumed as a first vehicle 20-1, and the user of the first vehicle 20-1 is referred to as a first user. Another one of the plurality of vehicles 20 is assumed as a second vehicle 20-2, and the user of the second vehicle 20-2 is referred to as a second user. Another one of the plurality of vehicles 20 is assumed as a third vehicle 20-n, and the user of the third vehicle 20-n is referred to as a third user.

In the disclosure, the first vehicle 20-1 and the first user may represent the same object. For example, when the first vehicle 20-1 and the second vehicle 20-2 belong to one group, it may be understood that the first user and the second user belong to one group.

Referring to FIGS. 8 and 9, the vehicle 20 according to an embodiment may provide a user interface for using the system 1 for assisting circuit driving (1000).

For example, the first vehicle 20-1 may control the user interface part 240 to display a user interface (hereinafter, referred to as a 'first user interface') for using the system 1 for assisting circuit driving.

The first user interface may include a menu for recording driving data, a menu for sharing driving data with others, a menu for inputting vehicle information, and a menu for searching for driving data of others. According to various embodiments, the first user interface may further include various menus for the user to share circuit driving data with others.

When the first user selects the menu for recording driving data, a visual feedback allowing activating of a mode for recording driving data of the first vehicle 20-1 and/or a visual feedback allowing selecting of an item in the driving data that is to be recorded may be provided.

The first user may select the menu for recording driving data to determine whether to store driving data acquired while driving a circuit in the first vehicle 20-1.

When the first user selects the menu for inputting vehicle information, a visual feedback for receiving vehicle information may be provided.

The first user may select the menu for inputting vehicle information to input tuning information of the first vehicle 20-1 and the like.

The tuning information of the first vehicle 20-1, which is not automatically acquired by the first vehicle 20-1, needs to be input by the first user. For example, the tuning information of the first vehicle 20-1 may include information about custom parts installed in the first vehicle 20-1.

The custom parts may include, for example, a carbon rear spoiler, a high-performance intake filter, a high-performance 4P caliper/disc, and/or wheel.

The server 10 may observe a change in the driving record according to the tuning information of the vehicle 20 from the plurality of vehicles 20, and acquire information about the effect of the custom parts.

Accordingly, the server 10 may recommend a specific custom part to each vehicle 20 based on the driving data received from the plurality of vehicles 20.

When the first user selects the menu for searching for driving data, a visual feedback for downloading driving data of another vehicle (e.g., the second vehicle 20-2) may be provided.

When the first user selects the menu for sharing driving data, a visual feedback allowing activating of a mode for sharing driving data of the first vehicle 20-1 and/or a visual feedback allowing selecting of an item in the driving data for which sharing is to be permitted. This will be described below with reference to FIG. 11.

The first user may activate the mode for sharing driving data of the first vehicle 20-1 to permit sharing of driving data acquired while driving the circuit in the first vehicle 20-1, so that first driving data acquired by the first vehicle 20-1 driving the circuit may be transmitted to the server 10.

That is, the first vehicle 20-1 may receive a user input from the first user to determine whether to permit sharing of the first driving data (1100).

In this case, the user input to permit sharing of the first driving data may include a first user-input to permit sharing of a part of the first driving data and a second user-input to permit sharing of all of the first driving data.

When the first user does not permit sharing of the first driving data (No in operation 1100), the first driving data may not be transmitted to the server 10.

That is, the vehicle 20 may transmit the first driving data to the server 10 only when the first user permits the sharing of the first driving data (Yes in operation 1100).

According to the present disclosure, by checking the user's intention to share, private information of the user may be prevented from being shared with others without permission.

The first vehicle 20-1 may, based on the first user-input to permit a part of the first driving data being received (No in operation 1200), transmit a permitted item in the driving data to the server 10 (1400).

For example, the first user may only permit sharing of driving record information and sensor value information, but may not permit sharing of profile information and driving image information.

The first vehicle 20-1 may, based on the second user-input to permit sharing of all of the first driving data being received (Yes in operation 1200, transmit all of the driving data to the server 10 (1300).

According to various embodiments, the first vehicle 20-1 may transmit the first driving data to the server 10 in real time while driving the circuit, or may transmit the first driving data stored in the first vehicle 20-1 to the server 10 based on driving the circuit being completed.

The server 10 may update the database 130 based on the first driving data being received from the first vehicle 20-1. For example, the first driving data may be utilized as data for constructing the database 130.

According to the present disclosure, a user may be allowed to freely select an item that the user desires to share, so that sharing of driving data is facilitated.

Figure 10:
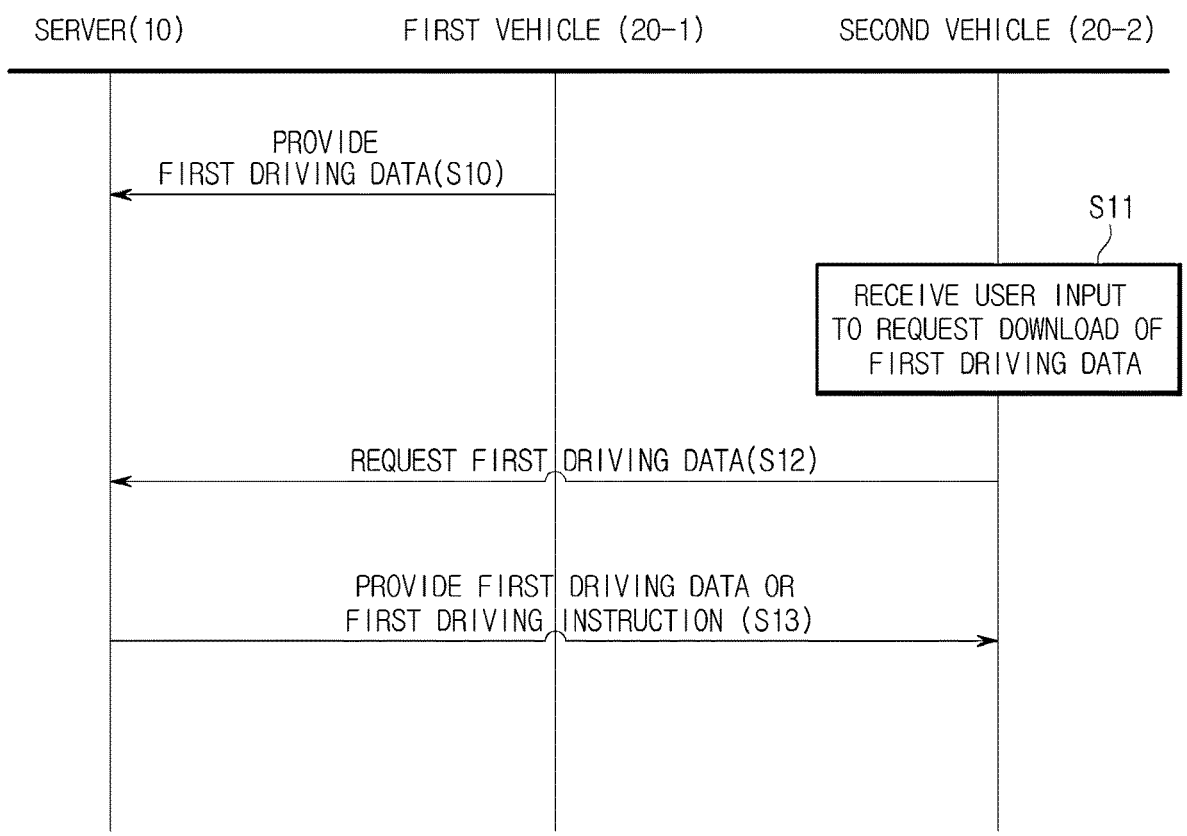
FIG. 10 is a flowchart showing an example of a method of a second user requesting first driving data from a first user.

FIG. 10 is a flowchart showing an example of a method of a second user requesting first driving data from a first user. FIG. 11 is a drawing illustrating an example of a user interface for a user to acquire driving data.

Referring to FIGS. 10 and 11, the first vehicle 20-1 may transmit first driving data to the server 10, and the server 10 may receive the first driving data from the first vehicle 20-1 (S10).

The server 10 may, based on the first driving data being received, update the database 130, and generate a driving instruction based on the updated database 130. As an example, the server 10 may generate a first driving instruction based on the first driving data, and add the first driving instruction to the database 130 as one of the plurality of driving instructions for the circuit.

The first driving instruction is obtained by simulating driving of the first vehicle 20-1 and generating a driving instruction based on the simulation.

That is, the first driving instruction may include guide information for allowing the circuit to be driven in the same way as the first vehicle 20-1.

The second vehicle 20-2 may provide the second user with a first user interface through the user interface part 240, and the second user may select a menu included in the first user interface to search for driving data of others.

For example, when the second user selects a menu for searching for driving data, a list of pieces of driving data of other drivers that are allowed for downloading may be displayed.

The second user may filter the driving data according to various categories, such as a circuit type, a driver's identity, and/or a vehicle type, to search for driving data desired by the second user.

When the vehicle type is set to Avante and the circuit type is set to Circuit A, the second user may be provided with a user interface for selecting driving data acquired by a plurality of users driving Circuit A using Avante.

The pieces of driving data acquired from the plurality of users may be listed in the order of fastest time in the driving records, but the listing criteria is not limited thereto.

The second user may select desired driving data, to download the desired driving data to the second vehicle 20-2.

For example, the second vehicle 20-2 may receive a user input to request downloading of the first driving data through the user interface part 240 (S11).

In this case, the user input to request download of the first driving data may be a user input to request download of the first driving instruction generated based on the first driving data.

The second vehicle 20-2 may, based on the user input to request download of the first driving data being received, transmit a request signal for requesting transmission of the first driving data and/or the first driving instruction to the server 10 (S12).

The server 10 may, based on the request signal from the second vehicle 20-2 being received, transmit the first driving data and/or the first driving instruction to the second vehicle 20-2 (S13).

The second vehicle 20-2 may store the first driving data and/or the first driving instruction received from the server 10, and the second user may receive the first driving data and/or the first driving instruction through the user interface part 240.

That is, the second user may drive the circuit according to the first driving instruction. In this case, the second user may check the trail line and/or break point and/or acceleration point of the first vehicle 20-1.

According to the present disclosure, the user may imitate a driving route of a driver desired by the user, so that the driving skill of the user may be improved. In addition, by virtually competing against a driver desired by the user, the user may maximize interest in circuit driving.

In addition, according to the present disclosure, the user may easily select driving data of a desired style.

Figure 12:
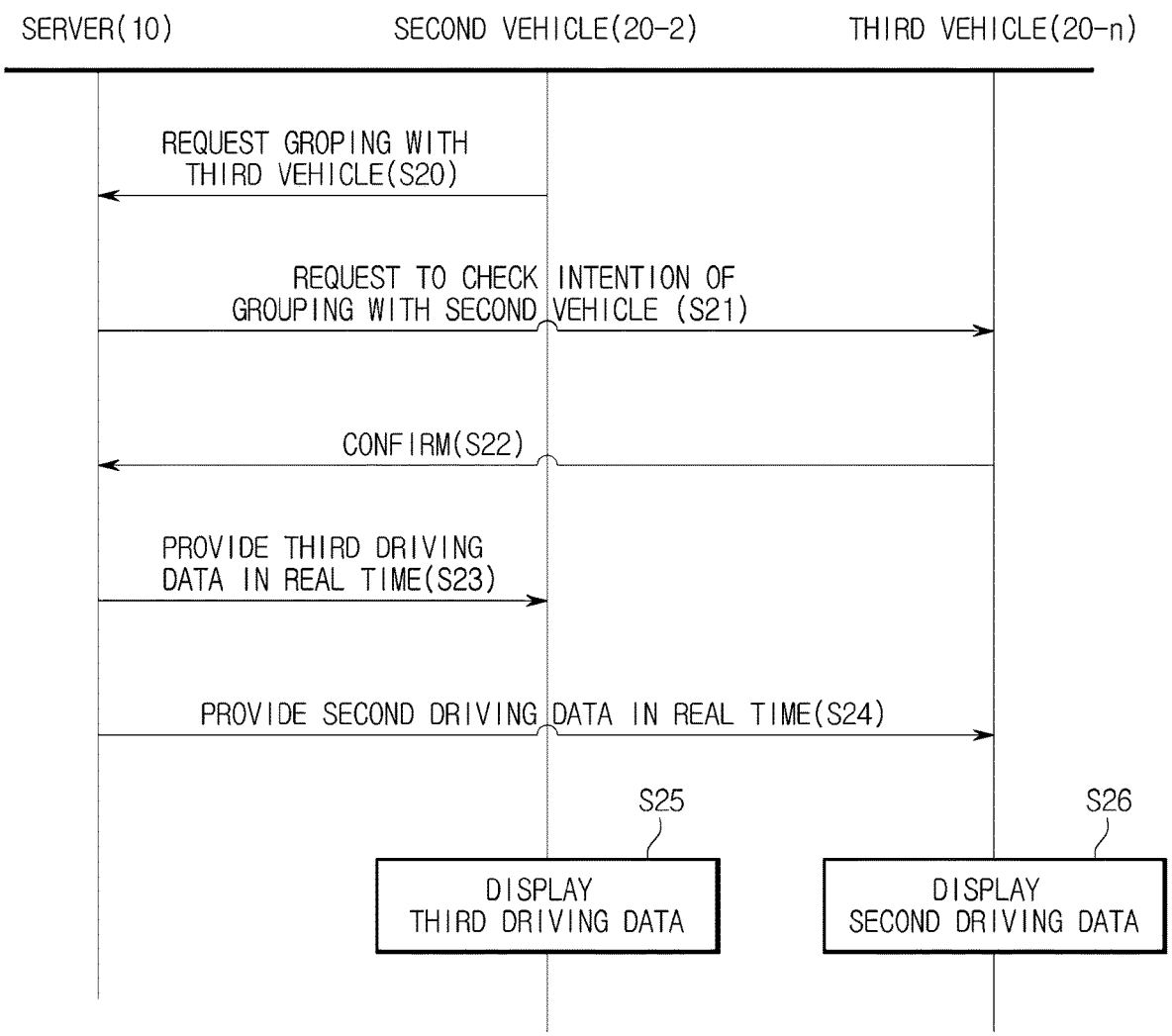
FIG. 12 is a flowchart showing an example of a method of grouping a plurality of users.
Figure 15:
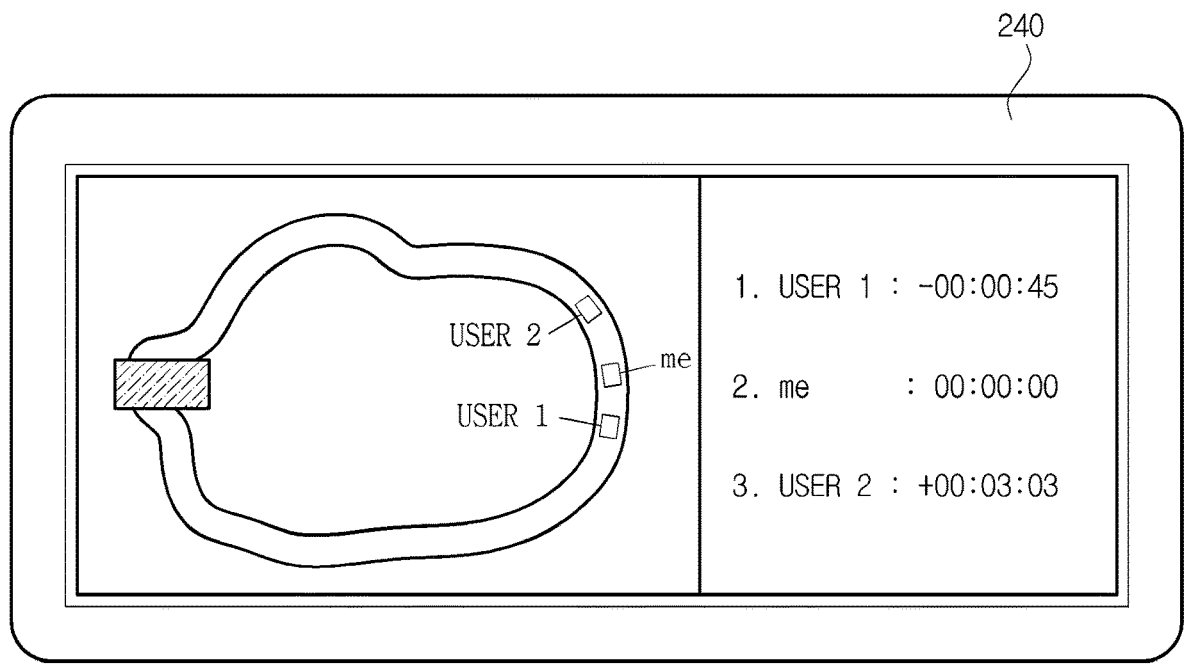
FIG. 15 is a diagram illustrating an example of a screen on which driving states of a plurality of vehicles are displayed in the case of group driving.

FIG. 12 is a flowchart showing an example of a method of grouping a plurality of users. FIG. 13 shows an example of a user interface that allows a user to join a group. FIG. 14 is a diagram illustrating an example of a user interface for allowing a user to select driving data to be transmitted from a group member. FIG. 15 is a diagram illustrating an example of a screen on which driving states of a plurality of vehicles are displayed in the case of group driving.

Hereinafter, for the sake of convenience of description, a process in which the second vehicle 20-2 and the third vehicle 20-n are grouped among the plurality of vehicles 20 will be described.

Referring to FIG. 12, at least one of the second vehicle 20-2 or the third vehicle 20-n may be configured to, upon a user input to classify the second vehicle 20-2 and the third vehicle 20-n into one group, transmit a classification request signal to the server 10 (S20).

Referring to FIG. 13, the second vehicle 20-2 may provide the second user with a user interface (hereinafter, referred to as a 'second user interface') for generating a group through the user interface part 240.

The second user interface may provide a menu for opening a group, a menu for inviting group members, and a menu for searching fora group.

The second vehicle 20-2 may identify the location of the second vehicle 20-2 through navigation information and/or GPS sensor information, and search for users enjoying a circuit (hereinafter referred to as circuit A) corresponding to the location of the second vehicle 20-2.

The second vehicle 20-2 may provide information about users who enjoy circuit driving in circuit A through the user interface part 240.

For example, information about users may include name (or an identification: ID) information of users, vehicle information of users, driving skill information of users (e.g., rankings A, B, and C), and/or current status information of users (e.g., waiting, driving).

The second user may request an invitation to a group to other users through the user interface part 240, and the second vehicle 20-2 may, based on a user input that invites the third vehicle 20-n to the group being received, transmit a request signal for requesting grouping with the third vehicle 20-n to the server 10.

The server 10 may, based on the request signal for requesting grouping with the third vehicle 20-n being received from the second vehicle 20-2, transmit a request signal for checking an intention of grouping with the second vehicle 20-2 to the third vehicle 20-n (S21).

The third vehicle 20-n may, based on the request signal for checking an intention of grouping with the second vehicle 20-2 being received from the server 10, provide a visual feedback for checking an intention of the third user through the user interface part 240.

The third vehicle 20-n may, based on a user input for confirming grouping with the second vehicle 20-2 being received from the third user, transmit a confirmation message to the server 10 (S22).

According to various embodiments, the second user may open a group through the user interface part 240, and other users may participate in the group open by the second user through the user interface part 240.

When the second user opens a group through the user interface part 240, the second user may open a private group by setting a password. In this case, other users need to input the set password to participate in the group opened by the second user.

The server 10 may, based on the classification request signal being received from at least one of the second vehicle 20-2 or the third vehicle 20-n, classify the second vehicle 20-2 and the third vehicle 20-n into one group.

The server 10 may be a medium through which users classified into one group share driving data in real time.

For example, the server 10 may, based on the second vehicle 20-2 and the third vehicle 20-n being classified into one group, transmit third driving data received from the third vehicle 20-n to the second vehicle 20-2 in real time (S23) and transmit second driving data received from the second vehicle 20-2 to the third vehicle 20-n in real time (S24).

According to various embodiments, the server 10 may transmit a third driving instruction generated based on the third driving data to the second vehicle 20-2 in real time, and may transmit a second driving instruction generated based on the second driving data to the third vehicle 20-*n* in real time.

That is, the server 10 may provide the third driving data and/or the third driving instruction to the second user in real time, and may provide the second driving data and/or the second driving instruction to the third user in real time.

Users belonging to one group may select an item of driving data and/or driving instruction desired to acquire from a group member.

Referring to FIG. 14, the user interface part 240 of the second vehicle 20-2 and/or the third vehicle 20-*n* may provide a user interface for managing a group.

The second user and/or the third user may check information about users belonging to the same group through the user interface part 240, and may set an item of driving data and/or driving instruction desired to acquire from users belonging to the group.

For example, when the second user desires to receive only a trail line, map information, and speed information from the third user, the second vehicle 20-2 may control the user interface part 240 to display the trail line, position, and speed of the third vehicle 20-*n* based on the third driving data and/or the third driving instruction.

As another example, when the second user desires to receive only a trail line and map information from the third user, the second vehicle 20-2 may control the user interface part 240 to display the trail line and location of the third vehicle 20-*n* based on the third driving data and/or the third driving instruction.

That is, the second vehicle 20-2 may control the user interface part 240 to display the third driving data and/or the third driving instruction based on the setting of the second user (S25).

In addition, the third vehicle 20-*n* may control the user interface part 240 to display the second driving data and/or the second driving instruction based on the setting of the third user (S26).

Referring to FIG. 15, it can be seen that information about other users belonging to the same group is displayed on the user interface part 240.

For example, the second vehicle 20-2 may display the location of the second vehicle 20-2 and the location of the third vehicle 20-*n* on the circuit map on the user interface part 240, may display the lap time of the second vehicle 20-2 and the lap time of the third vehicle 20-*n*, and display the best lap time of the second vehicle 20-2 and the best lap time of the third vehicle 20-*n*.

According to various embodiments of the present disclosure, the second vehicle 20-2 may display the current speed, steering amount, braking point, trail line, etc. of the third vehicle 20-*n* on the user interface part 240.

According to the present disclosure, users who enjoy circuit driving may compete while checking driving information of group members belonging to the same group, thereby providing a more interesting competition environment.

In addition, according to the present disclosure, since the lap times of group members are calculated based on the starting point and the ending point, group members may enjoy competition while checking records with each other even when the group members do not start at the same time.

Figure 16:
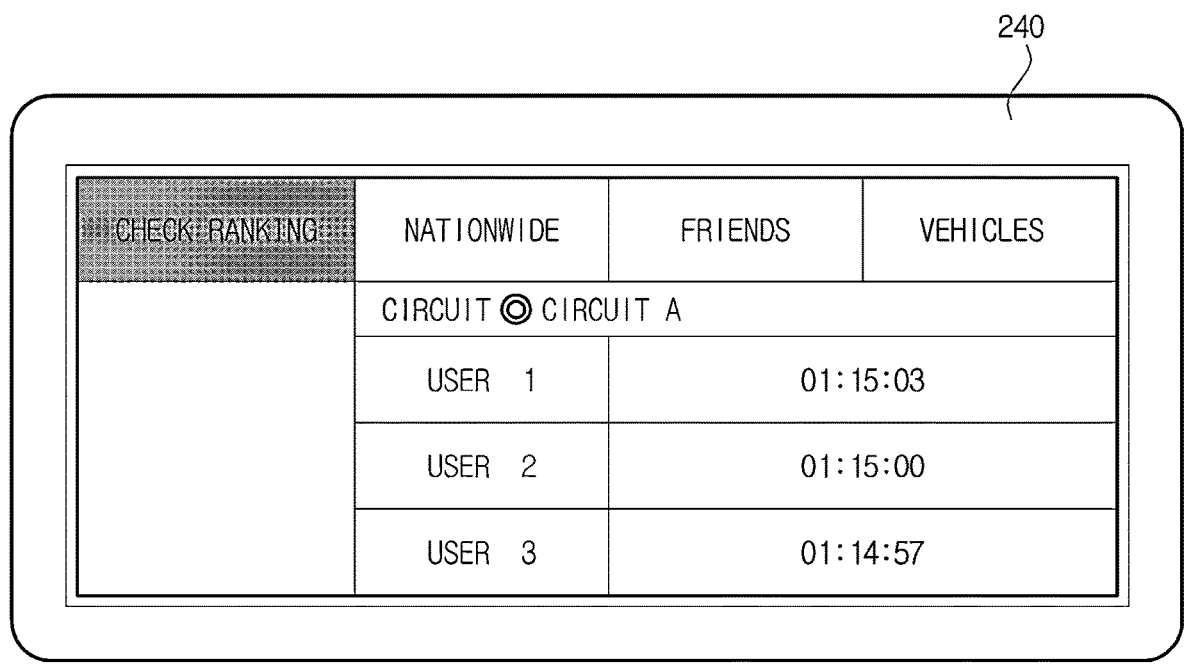
FIG. 16 is a diagram illustrating an example of a user interface for allowing a user to check his/her ranking.

FIG. 16 is a diagram illustrating an example of a user interface allowing a user to check his/her ranking.

Referring to FIG. 16, the server 10 may determine the rankings of the plurality of vehicles 20 for the circuit based on the updated database 130, and transmit the plurality of vehicles 20 with ranking information of the plurality of vehicles 20.

In this case, the rankings of the plurality of vehicles 20 may be determined according to various criteria.

For example, the rankings of the plurality of vehicles 20 may be determined based on a best lap time or an average lap time.

The user interface part 240 may provide a user interface for checking the ranking of the user, and the rankings of the users may be filtered based on the type of the circuit, user information (e.g., the user's residence, alma mater, friend, etc.), and the type of vehicle.

For example, a user may select a "Friends" menu to check his/her ranking among friends, select a "Vehicle" menu to check his/her ranking among drivers driving in the selected type of vehicle, or select a "Region" menu to check his/her ranking among drivers in the selected region.

According to the present disclosure, a user may be interested in shortening the driving record by comparing his/her driving skill with those of others.

Although the embodiment of the system 1 for assisting circuit driving and a method of assisting circuit driving has been shown and described, the above embodiment is illustrative purpose only, and it would be appreciated by those skilled in the art that changes and modifications, which have not been illustrated above, may be made in these embodiments without departing from the principles and scope of the invention, the scope of which is defined in the claims and their equivalents.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, according to the disclosure, the method and system for assisting circuit driving can lower the entry barrier to the circuit driving for ordinary people.

According to the disclosure, the method and system for assisting circuit driving can provide users with interest to circuit driving.

According to the disclosure, the method and system for assisting circuit driving can allow users to easily compare driving skills with each other.

According to the disclosure, the method and system for assisting circuit driving can allow users to identify and make up for the weakness of the users to improve the circuit driving skills.

What is claimed is:
1. A method of managing driving data for assisting circuit driving, the method comprising:
constructing a database based on source data including driving data for a circuit that has a road without lane;
generating a driving instruction for the circuit based on the database;
providing at least one vehicle with the driving instruction;

updating the database based on first driving data acquired by a first vehicle driving the circuit;
updating the driving instruction for the circuit based on the updated database; and
providing the at least one vehicle with the updated driving instruction,
wherein the driving instruction has information on a recommended trail line of the circuit and the recommended trail line includes information on a record line to drive the circuit on an optimal path,
the updating of the database includes:
receiving a user input from a first user who drives the first vehicle to permit sharing of the first driving data; and
updating the database based on the first driving data when the user input is received, and
the receiving of the user input to permit sharing of the first driving data includes:
receiving a first user input to permit sharing of a part of the first driving data; and
receiving a second user input to permit sharing of all of the first driving data.

2. The method of claim 1, wherein the first driving data includes
at least one of profile information of a first user who drives the first vehicle, information about the first vehicle, information about sensor values acquired from a plurality of sensors provided in the first vehicle, image information acquired from a camera provided in the first vehicle, or driving record information of the first vehicle.

3. The method of claim 2, wherein the information about the first vehicle includes tuning information of the first vehicle.

4. The method of claim 1, further comprising:
receiving, from a second user who drives a second vehicle, a user input for requesting download of the first driving data; and
providing the second vehicle with the first driving data based on the user input being received from the second user.

5. The method of claim 1, wherein the updating of the driving instruction for the circuit based on the updated database includes:
generating a first driving instruction based on the first driving data; and
adding the first driving instruction as the driving instruction for the circuit.

6. The method of claim 5, further comprising:
receiving, from a second user who drives a second vehicle, a user input for requesting download of the first driving instruction; and
providing the second vehicle with the first driving instruction based on the user input being received from the second user.

7. The method of claim 1, further comprising:
based on a user input to classify a second user who drives a second vehicle and a third user who drives a third vehicle into one group being received, classifying the second user and the third user into the one group; and
based on the second user and the third user belonging to the one group, providing the third vehicle with second driving data acquired by the second vehicle driving the circuit in real time, and providing the second vehicle with third driving data acquired by the third vehicle driving the circuit in real time.

8. The method of claim 1, further comprising:
determining a ranking of the at least one vehicle for the circuit based on the updated database, and providing the at least one vehicle with information about the ranking of the at least one vehicle.

9. A system for managing driving data for assisting circuit driving, the system comprising:
a server configured to store a database that is constructed based on source data including driving data for a circuit that has a road without lane, generate a driving instruction for the circuit based on the database, and transmit the driving instruction to at least one vehicle; and
the at least one vehicle configured to receive the driving instruction from the server,
wherein a first vehicle among the at least one vehicle is configured to transmit, to the server, first driving data acquired while driving the circuit,
the server is configured to update the database based on the first driving data, update the driving instruction for the circuit based on the updated database, and transmit the updated driving instruction to the at least one vehicle,
the driving instruction has information on a recommended trail line of the circuit and the recommended trail line includes information on a record line to drive the circuit on an optimal path,
the first vehicle is configured to, when a user input to permit sharing of the first driving data is received, transmit the first driving data to the server, and
the first vehicle is configured to,
based on a first user input to permit sharing of a part of the first driving data being received, transmit the part of the first driving data to the server, and
based on a second user input to permit sharing of all of the first driving data being received, transmit all of the first driving data to the server.

10. The system of claim 9, wherein the first driving data includes
at least one of profile information of a first user who drives the first vehicle, information about the first vehicle, information about sensor values acquired from a plurality of sensors provided in the first vehicle, image information acquired from a camera provided in the first vehicle, or driving record information of the first vehicle.

11. The system of claim 10, wherein the information about the first vehicle includes tuning information of the first vehicle.

12. The system of claim 9, wherein a second vehicle among the at least one vehicle is configured to, based on a user input to request download of the first driving data being received, transmit a request signal for requesting transmission of the first driving data to the server, and
the server is configured to, based on the request signal being received from the second vehicle, transmit the first driving data to the second vehicle.

13. The system of claim 9, wherein the server is configured to:
generate a first driving instruction based on the first driving data; and
add the first driving instruction as the driving instruction for the circuit.

14. The system of claim 13, wherein a second vehicle among the at least one vehicle is configured to, based on a user input to request download of the first driving instruction being received, transmit a request signal for requesting transmission of the first driving instruction to the server, and the server is configured to, based on the request signal being received from the second vehicle, transmit the first driving instruction to the second vehicle.

15. The system of claim 9, wherein the at least one vehicle includes a second vehicle and a third vehicle, and
at least one of the second vehicle or the third vehicle is configured to, based on a user input to classify the second vehicle and the third vehicle into one group being received, transmit a classification request signal to the server, and
the server is configured to, based on the classification request signal being received, classify the second vehicle and the third vehicle into the one group, and based on the second vehicle and the third vehicle belonging to the one group, transmit second driving data acquired by the second vehicle driving the circuit to the third vehicle in real time, and transmit third driving data acquired by the third vehicle driving the circuit to the second vehicle in real time.

16. The system of claim 9, wherein the server is configured to
determine a ranking of the at least one vehicle for the circuit based on the updated database, and provide the at least one vehicle with information about the ranking of the at least one vehicle.

\* \* \* \* \*